June 4, 1968   J. L. McCURDY   3,387,067
LOW DENSITY PLASTIC FOAM ARTICLE AND PRODUCTION TECHNIQUE
Filed May 20, 1965   2 Sheets-Sheet 1

INVENTOR.
John Lloyd McCurdy
BY
Eugene M. Giles  Atty.

United States Patent Office 3,387,067
Patented June 4, 1968

3,387,067
LOW DENSITY PLASTIC FOAM ARTICLE AND
PRODUCTION TECHNIQUE
John Lloyd McCurdy, Palos Verdes Estates, Calif., assignor to Standard Oil Company, Chicago, Ill., a corporation of Indiana
Continuation-in-part of application Ser. No. 215,738, Aug. 8, 1962. This application May 20, 1965, Ser. No. 463,446
2 Claims. (Cl. 264—53)

This application is a continuation in part of application Ser. No. 215,738 filed Aug. 8, 1962 and now abandoned. The invention relates to a method for the production of uniform low density foam articles. More particularly, the present invention relates to improvements in the foam density characteristics of such articles.

The production of low density foam articles by use of thermoplastic solid particles or beads containing an expanding agent is well-known. The prior methods using such beads have been found to produce an article which is of non-uniform density. This is due to the fact that as these solid beads are expanded each cell within the bead exerts a pressure which should be uniform over the entire surface area of the cell. However, since each cell within the mass is to push the surrounding mass outwardly, the deeper within the mass the expanding cell is located the greater the resistance is to expansion. For that reason a gradient density occurs, i.e. the density of the cells increases with their proximity to the center of the bead.

The initial expansion or pre-expansion in the process known as a two-step process produces a partially foamed particle with a high density core when these beads are utilized. The final expansion which involves integrating these partially foamed particles into a coalesced mass results in a foam article of variable density. The article will contain zones of relatively high density corresponding to the core of the pre-expanded particle from which the particular zone was derived. The density variation is undesirable from the standpoint of uniformity of strength throughout the coalesced mass and maximum strength from a minimum quantity of plastic material used.

It is an object of the present invention to provide a method for making a thermoplastic foam material of uniform density. It is a further object of the invention to provide a method for making a uniform low density foam per unit strength in a coalesced mass. It is still a further object of this invention to provide an initial form of expandable plastic having a freedom of expansion which facilitates the evolution of foam. Other objects and advantages will become apparent as the description of the invention proceeds.

The method of this invention comprises the preparation of an expandable plastic in a form which will allow freedom of expansion of the plastic due to a lack of resistance of surrounding cells. FIGURES 1 and 5 in the accompanying drawing show two types of initial foamable plastic elements which may be used in accordance with this invention. Preferably the element is made in a hollow form with the plastic, which will eventually be foamed, in the form of a thin wall extending around and defining an opening of large enough capacity for free expansion of foam inwardly from the defining wall. For this purpose the elements may be hollow ball form, tubular or other form which will provide such opening for free expansion. The elements may be produce quite readily by extrusion and these extrusions may be cut into easily handled small tubes, preferably cylindrical although other shapes are equally workable. The raising agent or expanding agent, which is contained within the thermoplastic material, may be any of those available for foaming including volatile hydrocarbon liquids, e.g. petroleum ether, pentane, hexane, cyclopentane, cyclohexane, benzene and the like. A thermoplastic is employed which is capable of being softened by applied heat for responsiveness to the cell pressure. Vinyl aromatic resinous polymers, such as polystyrene, are particularly suitable for this purpose. The foaming of the particles may be effected by heating the thermoplastic, containing the expanding agent, which has a boiling point lower than the softening point of the thermoplastic, to a temperature above such softening point. In the first of the two discrete steps involved, the particles are pre-expanded individually to separate individual masses of foam, usually of the approximate density required for the ultimate foam of the material or article to be made therefrom. This involves foaming the thermoplastic incompletely, so as to be able to complete the foaming in the second step, wherein the pre-expanded foam particles are collectively expanded further by additional heat and coalesced into an integral mass of foam within the shaping confines of a mold or other confining means by which the desired ultimate form or shape of the plastic foam material or article is imparted to the coalesced mass. In the first step it is customary to maintain the particles or beads in a constant state of agitation to promote freedom of individual expansion and prevent agglomeration.

Figure 6:
FIGURE 6 is representative of the solid pellet foam of particles or beads heretofore employed in the two-step technique of making plastic foam articles.
Figure 7:
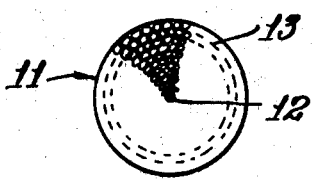
FIGURE 7 is a cross section of the pellet of FIGURE 6 as expanded in the first step on expansion.
Figure 8:
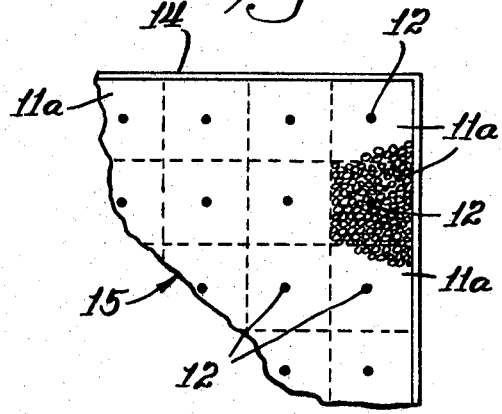
FIGURE 8 shows part of a coalesced unitary mass of foam as in FIGURE 4 but made from solid pellets as shown in FIGURE 6.

Referring to the drawings, FIGURES 6, 7 and 8 do not shows applicant's invention but are included for comparison only to facilitate an understanding of the invention.

Figure 1:
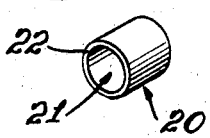
FIGURE 1 is an enlarged perspective view of a hollow tubular initial element of expandable plastic which is useable in accordance with this invention in two-step foaming and coalescence with others into an eventual unitary mass.

In FIGURE 1 the element 20 is shown as a tube or hollow cylindrical body with a large opening 21 surrounded and defined by the expandable thermoplastic cylindrical wall 22. When this tube 20 is pre-expanded in the step corresponding to that by which the bead 10 in FIGURE 6 is expanded to the form 11 in FIGURE 7, it is expanded to a greatly enlarged generally cylindrical foam mass, substantially as indicated at 23 in FIGURE 2, and FIGURE 3.

Figure 3:
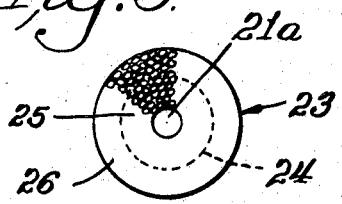
FIGURE 3 is a cross section on the line 3—3 of the expanded element of FIGURE 2.

In the expansion of the element 20, foam evolves outwardly and inwardly in substantially equal proportions from the cylinder wall 22. The broken lines at 24 in FIGURE 3 show the position occupied by the original cylinder wall 22 before evolution of foam, and 25 indicates the foam evolved inwardly and 26 the foam evolved outwardly.

The opening 21 in the element 20 is of suitable diameter to provide sufficient capacity for free and full expansion of the foam evolved inwardly from the surrounding wall 22 during the pre-expansion and the final expansion steps of the foaming. To accommodate the additional foam volume occurring in the final expansion, the opening 21 is large enough to leave a reduced central opening as indicated at 21a in FIGURES 2 and 3. It is to be noted that since the opening 21 is surrounded by the wall 22 it is protected from any extraneous interference or resistance during the evolution of foam which may, therefore, occur freely. In addition, the shape of the initial element in FIGURE 1 provides a much greater area per unit mass than the solid beads of FIGURE 6 and accordingly there is a much larger area of expansion.

The cylindrical form also permits the thermoplastic to be contained within a thin wall which helps to avoid any appreciable gradient of density between the inner and outer surfaces of the wall. Since there are no concentrations of resistance to expansion in any localized nucleus or core, as resistance encountered by the cylindrical form occurs equally throughout a mid-way place or zone between the inner and outer surfaces of the wall, the density build-up at the core is absent. By way of comparison, 13 indicates a band of cells in the solid pellet which necessarily meets with resistance during expansion, due to the forces exerted on it by cells nearer the center, and due to its pushing of the cells more towards the surface of the bead.

Figure 2:
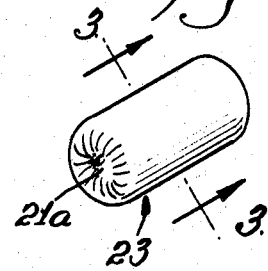
FIGURE 2 is a corresponding perspective view of the element of FIGURE 1 as expanded in the first step of expansion.
Figure 4:
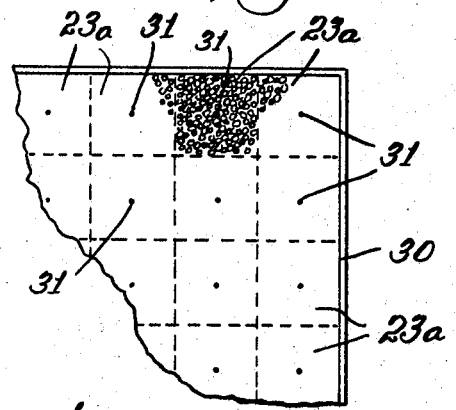
FIGURE 4 shows part of a coalesced unitary mass of foam, after final expansion within the mold, which is made from elements as shown in FIGURE 1 after pre-expansion as shown in FIGURES 2 and 3.

When the partially foamed hollow elements of FIGURE 2 are further expanded in a mold or other confining means as represented in FIGURE 4, wherein a portion of the mold is indicated at 30, this further expansion proceeds inwardly unobstructedly to fill the preserved openings 21a and outwardly to fill the voids around and between the prefoamed elements to produce a solid foam mass. The further expanded mass retains the uniformity of density established in the pre-foamed element 23 and thus insures general uniformity of density throughout the coalesced integrated mass. The corresponding prior art is contrasted in FIGURE 8 wherein a portion of the mold used with the solid bead is shown at 14, and the coalesced mass of non-uniform density obtained by use of such beads is indicated at 15.

The fully expanded elements 23a of the present invention are disposed in random manner throughout the mass but for comparison with FIGURE 8, the cross section as shown in FIGURE 4 is presented in such a manner as to clearly show that there is an absence of any core corresponding to the cores 12 in the finally expanded beads heretofore employed. The pre-expanded elements 23, therefore, are assumed to expand to generally square cross section to fill the voids. This is indicated by dotted lines in square form 23a (corresponding to 11a). The centers of the fully expanded elements are indicated at 31 but there is no core there or elsewhere throughout the mass.

The particular dimensions of the cylinders 20 should be determined with reference to the expansion characteristics of the thermoplastic employed and the appropriate diameter of the opening 21, and the thickness of the wall 22, and the length of the cylinder may be ascertained to give the best results. The yield of volume of foam of the required final density is important and the opening 21 should be of a diameter to accommodate the amount of foam evolved inwardly from the surrounding wall 22 without leaving an opening. Therefore the size and thickness of the wall should be such as to produce the required amount of foam. The length of the cylinder may be varied to reduce the wall thickness for a given amount of thermoplastic.

Figure 9:
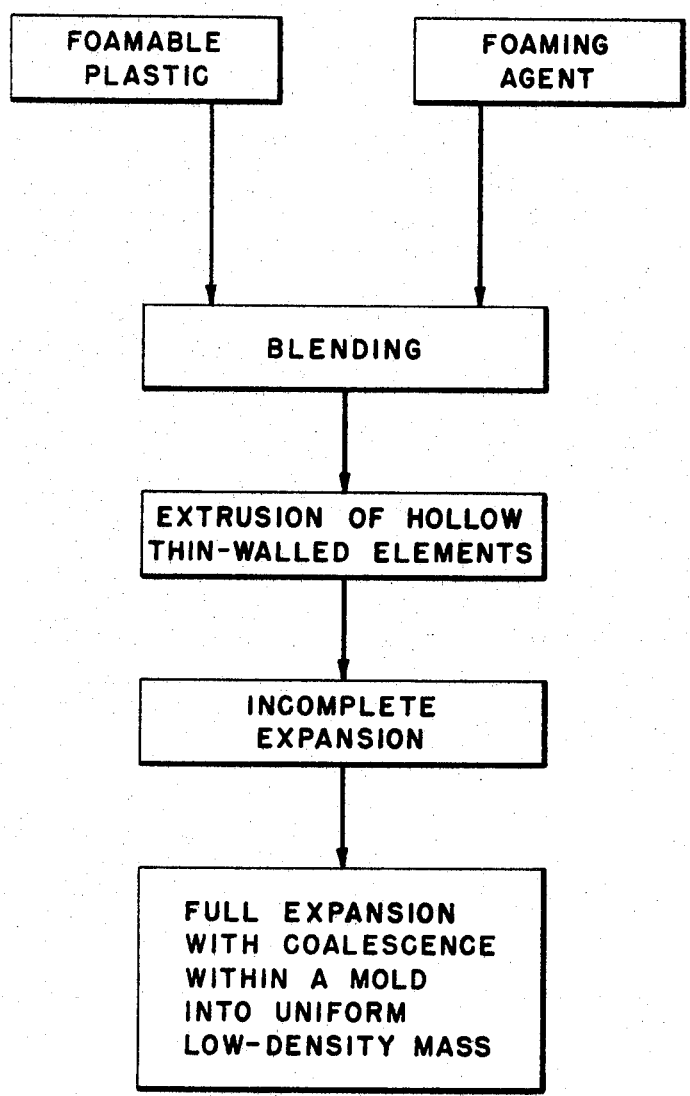
FIGURE 9 illustrates a process by which uniform low density foam mass may be produced.

The process of this invention is further explained by reference to FIGURE 9. A foamable plastic and foaming agent are blended and then extruded to form hollow thin-walled elements as illustrated in FIGURE 1. These elements are then incompletely expanded, preferably with agitation. The pre-expanded elements are then fully expanded and coalesced within a confining means, such as a mold, into a uniform low density foam mass.

Example

A polymer of density 65.5 pounds per cubic foot may be used to produce finished articles of density 1 pound per cubic foot and the plastic would necessarily expand 65.5 times the original volume. Assuming equal expansion inward and outward from the cylinder wall 22 the inside cross sectional area of the cylinder should be 32.75 times the cross sectional area of the wall 22. A cylindrical tube 22 of ⅛ inch length and 5 micron wall thickness and inside (opening) diameter of ³⁄₁₆ inch is appropriate for such plastic. For final density of 2 pounds, for example, an inside diameter of ³⁄₃₂ of an inch would be appropriate.

Figure 5:
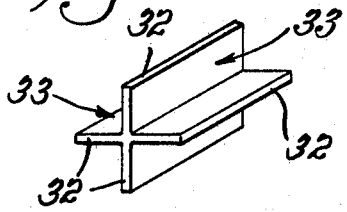
FIGURE 5 shows another form of initial element which may be used in accordance with this invention.

Another extruded form of element which may be used is shown in FIGURE 5, wherein the thermoplastic is in the form of thin longitudinal flanges 32, at intervals. Between said flanges are voids 33, which allow free expansion of foam even though an enclosure of the space is not provided.

While the invention is shown and described in a preferred form, various changes may be made without departing from the principles of the invention.

I claim:
1. A method of making a solid mass of uniform low density foam which comprises heating a plurality of hollow, thin-walled elements made of a thermoplastic containing in the thermoplastic a volatile expanding agent having a boiling point lower than the softening point of the thermoplastic, to a temperature above the softening point of the thermoplastic, so as to incompletely expand the elements, both outwardly and inwardly from their walls, into individual foam masses and thereafter collectively further expanding and coalescing within a confining means, by further application of heat, said individual masses into an integral mass of foam said thin walls being of sufficient dimension so as to completely fill, upon expansion, said elements and said confining means.

2. A method according to claim 1 wherein the thermoplastic element is in the shape of a hollow cylinder.

References Cited
UNITED STATES PATENTS

| 2,787,809 | 4/1957 | Stastny | 264—53 |
| 3,066,382 | 12/1962 | Sweigle et al. | 28—78 |

FOREIGN PATENTS 850,634 10/1960 Great Britain.

ALEXANDER H. BRODMERKEL, Primary Examiner.

DONALD J. ARNOLD, Examiner.

P. E. ANDERSON, Assistant Examiner.